United States Patent
Brant et al.

[11] 3,799,522
[45] Mar. 26, 1974

[54] APPARATUS FOR INTRODUCING GAS INTO LIQUID METAL

[75] Inventors: Malcolm Victor Brant, Bucks; Michael Edwards, Waltham near Maidenhead, Berks, both of England

[73] Assignee: The British Aluminum Company Limited, London, England

[22] Filed: Oct. 6, 1972

[21] Appl. No.: 295,534

[30] Foreign Application Priority Data
Oct. 8, 1971 Great Britain.................... 46974/71

[52] U.S. Cl............................. 266/34 PP, 266/34 T
[51] Int. Cl............................................. C22b 21/06
[58] Field of Search.......... 266/34 T, 34 PP, 34 PT, 266/34 R; 75/45, 59, 60

[56] References Cited
UNITED STATES PATENTS
3,565,412 2/1971 Moniot........................... 266/34 PP
3,025,155 3/1962 Lee et al. ....................... 266/34 T X
3,430,940 3/1969 Criss................................. 266/34 T
3,033,550 5/1962 Harders............................ 266/34 T
3,503,597 3/1970 Kessler et al.................... 266/34 PP Primary Examiner—Roy Lake
Assistant Examiner—James F. Coan
Attorney, Agent, or Firm—Karl W. Flocks

[57] ABSTRACT

The invention concerns apparatus for introducing a gas into liquid metal and provides a member formed of silicon carbide or alumina bonded with a binding material comprising the oxides and silicates of zirconium, titanium or aluminium, the member having a tubular stem portion and a diffusing portion at an angle thereto between 45° and 135° and preferably 90°, the stem portion being made gas impermeable preferably by insertion of a gas feed tube coaxially sealed therein.

8 Claims, 1 Drawing Figure

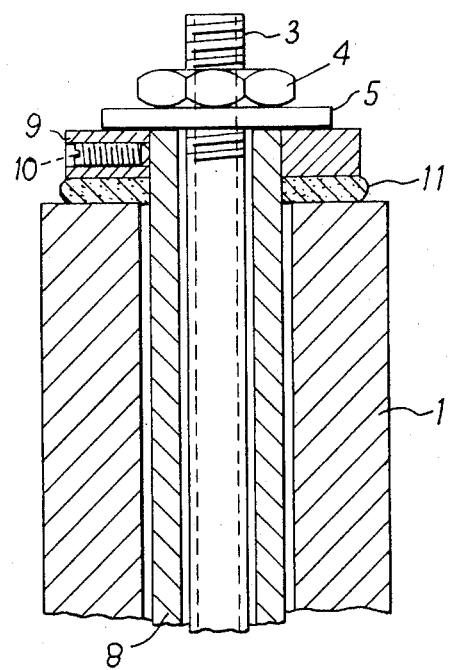
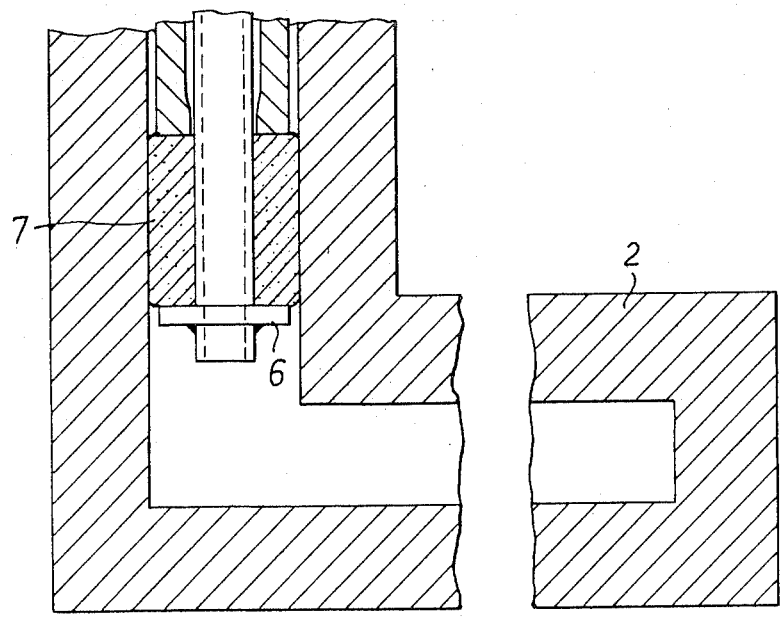

APPARATUS FOR INTRODUCING GAS INTO LIQUID METAL

BACKGROUND OF THE INVENTION

The present invention relates to apparatus for introducing gas into a liquid metal.

It is often desired to introduce gases into liquid metals, for example in the degassing and cleaning of liquid metal such as liquid aluminium by the process described and claimed in commonly assigned U.S. Pat. Application Ser. No. 71112. Usually the gases are introduced through open ended tubes extending into the liquid metal with their open ends located close to the bottom of the containing vessel, for example, a crucible, a brick-lined box or the "gassing bay" of a reverberatory furnace. It is known that the gases are more effective for their intended purpose when introduced into the liquid metal in the form of fine bubbles through some form or porous refractory brick or other porous refractory member. Tubes with their ends closed by or terminating in a component of porous refractory material have been tried.

Many difficulties arise in practice. Thus if porous bricks are used it is not practicable to immerse these repeatedly in liquid metal since failure soon occurs through thermal shock.

Better results have been obtained by building the porous components into the wall or floor of the containing vessel so that the components are well supported laterally against cracking. It has been found, however, that it is only a matter of time before the porous components block up and fail to pass the gas at a satisfactory rate even when the gas is supplied under considerable pressure.

Good results have been obtained with porous refractory diffuser tubes made of porous graphite or of low porosity graphite cemented to porous carbon and inserted horizontally through a wall of the containing vessel. However, these horizontally disposed tubes cannot be replaced without taking the container out of service which is particularly disadvantageous if the container forms part of a continuous process.

Diffusers predominantly of carbonaceous material have other disadvantages. When used for introducing some gases into certain metals, for example, nitrogen into liquid aluminium, they lead to fouling of the metal. It is difficult to make a gas tight joint between the diffusers and the gas supply pipes and the joints often fail through oxidation of the material. Such diffusers have to be machined from the solid so they are usually in the form of a straight tube which means that when they are inserted from the top into the conventional containers for liquid metal the tube is too steeply inclined to give the best results. Attempts have been made to construct diffusers of shapes that will give more satisfactory introduction of the gas into liquid metal by making the diffusers of two or more parts, but the joining of the parts has presented difficulties both initially and during use.

The Applicants have carried out extensive simulatory experiments using water at ambient temperature to represent liquid aluminium which has a viscosity practically the same as that of water. It was found that to obtain fine bubbles from a porous diffuser it was necessary to have a low back pressure through the diffuser. It was also found advantageous to use a diffuser of a shape other than a straight tube. With a straight tube gas bubbles were found to cling to the tube and were not usefully dispersed throughout the liquid metal. Moreover the small gas bubbles tended to coalesce into larger bubbles.

SUMMARY OF THE INVENTION

The present invention provides apparatus for introducing a gas into liquid metal comprising a hollow member formed of silicon carbide bonded with a binding material consisting of the oxides and/or silicates of zirconium, titanium or aluminium, the member having a tubular stem portion made substantially gas impermeable and a diffusing portion in connection with the stem portion and extending at an angle thereto so that when introduced from the top of a vessel into molten metal therein, the diffusing portion can be inclined to the horizontal at an angle of less than 45°. A suitable quantity of the binding material is 15–40 percent by weight of the final mixture and preferably 20–33 percent by weight.

The stem and diffuser tube may together form an apparatus of substantially T or L shape.

In another form of the invention alumina is substituted for silicon carbide and is bonded with the oxides and/or silicates of zirconium or titanium. It has been found that by firing the refractory material at higher temperatures (1300-1500° C or above) a less porous product is obtained, but has a porosity move favourably distributed for its use as diffuser tubes and thus enables large volumes of gas to to be passed at low pressure.

Preferably the stem is made impermeable by means of a coaxial impermeable tube sealed therein. There must be a gas tight connection between the diffusing tube and a gas supply pipe. Since the oxide/silicate bonded SiC and alumina material is extremely hard to machine the formation of direct mechanical joints presents problems. Moulding of a metal screw threaded portion into the end of such a refractory stem during production of the apparatus was not satisfactory as the stem was liable to crack in the neighbourhood of the insert. With the introduction of an impermeable tube clamped in the stem the problem is overcome.

DETAILED DESCRIPTION OF AN EMBODIMENT OF THE INVENTION

An embodiment of apparatus according to the invention is now described by way of example, reference being made to the single FIGURE of the accompanying drawing which shows a cross-section of the apparatus.

The apparatus comprises a hollow member having a stem 1 and a tubular diffuser portion 2 integrally moulded from the material according to the invention. An impermeable gas feed tube 3 extends coaxially of the stem 1 and is screw-threaded at its upper end to receive a nut 4 and washer 5. The screw-threaded upper end can be further connected to a gas supply pipe. A washer 6 forming flange means is fixed to the lower end of the tube 3 and forms a base for a wad 7 of silicate fibre (preferably of the kind known commercially as Triton Kaowool). The wad 7 is compressed by a tube 8 having at its upper end flange means formed by a back-up plate 9 fixed in position by grub screws 10. A gasket 11 of Triton Kaowool is located between the upper end of the stem 1 and the plate 9.

To assemble the apparatus the gas feed tube 3 is inserted into the stem 1 and the wad 7 of Kaowool is fed into the space between the tube 3 and the stem 1. The tube 8 is inserted into the stem 1 and pressed down to compress the wad 7. The gasket 11 is placed in position followed by the plate 9 which is secured to the tube 8 by the screws 10. The washer 5 is placed on the tube 3 then the nut 4 which is tightened.

If desired more Kaowool can be used than is shown in the figure to provide additional support and increase the resistance of the apparatus to mechanical shock.

Apparatus like that just described having a total height of 650 mm., an overall width of 380 mm and with the outer diameter of the diffuser portion of 70 mm and inner diameter 24 mm has been found capable under test of passing nitrogen into aluminium at flow rates in excess of 150 cu.ft/hr and with a back pressure to initiate flow not exceeding a few p.s.i. (for example up to 5 p.s.i.) even after many days operation. Leakage of gas was not detected from the joints even with gas pressures up to 50 p.s.i.

The following table shows the results obtained under production conditions with diffuser tubes all of approximately 380 mm length and 70 mm outer diameter made from different materials and placed in different position. The metal used was remelted aluminium scrap without any prior degassing or fluxing treatment, and it was processed by the process described in U.S. Pat. Application Ser. No. 71112. In all cases the incoming metal showed 50 or more bubbles in the vacuum gas test operated at under 5 Torr and the outgoing metal nil bubbles except for (B) where the average bubble count on the treated metal was 2. In case (D) it was not possible to produce a higher metal flow rate than 550 lb/min.

| Ref. | Type of diffuser | Orientation | No. of diffusers | Max. metal flow rate successfully treated (lb/min.) | Max. metal flow rate treated per diffuser (lb/min.) |
|---|---|---|---|---|---|
| A | Straight: Hard graphite with porous carbon side | Horizontal | 4 | 260 | 65 |
| B | Straight: Hard graphite with porous carbon end plug | Vertical | 4 | 150 | 38 |
| C | Straight: porous graphite | Horizontal | 7 | 650 | 94 |
| D | "L"-shaped Oxide/silicate bonded SiC (in accordance with the Figure) | Vertical | 2 | 450 | 225 |
|   |   | Vertical | 3 | 550 | 180 |

We claim:

1. Apparatus for introducing a gas into liquid metal comprising a hollow member formed of silicon carbide bonded with a binding material selected from the group consisting of the oxides and silicates of zirconium, titanium and aluminium, the binding material comprising 20 to 33 percent by weight of the whole, the member having a tubular stem portion made substantially gas impermeable and a diffusing portion in communication with the stem portion and extending at an angle thereto of between 45° and 135°.

2. Apparatus for introducing gas into liquid metal comprising a hollow member moulded in a single piece from silicon carbide bonded with a binding material selected from the group consisting of the oxides and silicates of zirconium, titanium and aluminium, the member having a tubular stem portion made substantially gas impermeable and a diffusing portion in communication with the stem portion and extending at an angle thereto of between 45° and 135°.

3. Apparatus for introducing a gas into liquid metal comprising a hollow member moulded in a single piece from alumina bonded with a binding material selected from the group consisting of the oxides and silicates of zirconium and titanium, the binding material comprising 20 to 33 percent by weight of the whole, the member having a tubular stem portion made substantially gas impermeable and a diffusing portion in communication with the stem portion and extending at an angle thereto of between 45° and 135°.

4. Apparatus according to claim 3 in which the hollow member is substantially L-shaped.

5. Apparatus for introducing a gas into liquid metal comprising a hollow member of porous refractory material having a hollow stem portion in communication with a diffusing portion extending at an angle to the stem of between 45° and 135°, a hollow impermeable, gas feed tube disposed coaxially within the stem portion and a heat resisting material compressed between the tube and the refractory stem portion, so as to prevent access of gas between the tube and the stem portion, the refractory material being selected from silicon carbide and alumina bonded with a binding material selected from the group consisting of the oxides and silicates of zirconium, titanium and aluminium.

6. Apparatus according to claim 5 in which the tube has lower flange means at its lower end and a further tubular member of larger diameter extends between the tube and the interior wall of the stem portion and has upper flange means, the heat resisting material being compressed between the lower flange means and the lower end of the further tubular member and between the upper flange means and the top of the stem portion.

7. Apparatus according to claim 5 in which the heat resisting material is a refractory fibre and is compressed with a sufficient force to render it impermeable to gas at a pressure of at least 5 p.s.i.

8. Apparatus according to claim 5 in which the tube extends beyond the stem and is adapted for connection to a gas feed pipe.

* * * * *